(12) United States Patent
Senba et al.

(10) Patent No.: US 10,377,382 B2
(45) Date of Patent: Aug. 13, 2019

(54) VEHICLE CONTROLLER

(71) Applicant: Toyota Jidosha Kabushiki Kaisha, Toyota-shi Aichi-ken (JP)

(72) Inventors: Yoshiyuki Senba, Toyota (JP); Yoji Mizoguchi, Nagakute (JP); Masashi Oishi, Seto (JP); Satoaki Haruyama, Toyota (JP); Yoshikatsu Oda, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 87 days.

(21) Appl. No.: 15/609,949

(22) Filed: May 31, 2017

(65) Prior Publication Data
US 2017/0361846 A1 Dec. 21, 2017

(30) Foreign Application Priority Data
Jun. 21, 2016 (JP) .................. 2016-122774

(51) Int. Cl.
| | | |
|---|---|---|
| *B60W 30/18* | (2012.01) | |
| *B60T 8/17* | (2006.01) | |
| *B60T 13/58* | (2006.01) | |
| *B60W 10/188* | (2012.01) | |
| *B60W 10/192* | (2012.01) | |

(Continued)

(52) U.S. Cl.
CPC ....... *B60W 30/18109* (2013.01); *B60T 7/042* (2013.01); *B60T 8/17* (2013.01); *B60T 8/175* (2013.01); *B60T 13/588* (2013.01); *B60T 13/662* (2013.01); *B60T 13/686* (2013.01); *B60W 10/188* (2013.01); *B60W 10/192* (2013.01); *B60T 2260/09* (2013.01); *B60W 2520/04* (2013.01); *B60W 2540/10* (2013.01);
(Continued)

(58) Field of Classification Search
CPC .............................................. B60W 30/18109
See application file for complete search history.

(56) References Cited

U.S. PATENT DOCUMENTS

2011/0295478 A1\* 12/2011 Jeon ................. B60T 7/107
  701/70
2013/0116904 A1   5/2013 Watanabe et al.
(Continued)

FOREIGN PATENT DOCUMENTS

JP  2001-187564 A   7/2001
WO  2011/158855 A1  12/2011

*Primary Examiner* — Imran K Mustafa
(74) *Attorney, Agent, or Firm* — Dinsmore & Shohl LLP

(57) ABSTRACT

A vehicle controller applies a braking force to wheels using a hydraulic braking force generating mechanism and sets a vehicle driving torque, which is generated by an engine, to a second torque which is smaller than a first torque in a normal state, when a switch is switched to an ON state in a state in which a vehicle is traveling and an accelerator is turned on. Then vehicle stops, the vehicle controller implements an EPB mechanical operating state using a mechanical parking brake mechanism. When the switch is switched to an OFF state, the vehicle controller maintains the EPB mechanical operating state until an accelerator pedal operating level reaches "0," and maintains the vehicle driving torque at the second torque. Then the accelerator pedal operating level reaches "0", the EPB mechanical operating state is released and the vehicle driving torque is returned to the first torque.

4 Claims, 14 Drawing Sheets

(51) Int. Cl.
*B60T 7/04*      (2006.01)
*B60T 8/175*     (2006.01)
*B60T 13/66*     (2006.01)
*B60T 13/68*     (2006.01)

(52) U.S. Cl.
CPC ... *B60W 2710/188* (2013.01); *B60W 2720/00* (2013.01)

(56) References Cited

U.S. PATENT DOCUMENTS

2015/0066326 A1* 3/2015 Furuyama .............. B60T 7/042
                                              701/70
2017/0203762 A1* 7/2017 Khafagy ................ B60K 37/02

* cited by examiner

VEHICLE CONTROLLER

CROSS-REFERENCE TO RELATED APPLICATION

This application claims priority to Japanese Patent Application No. 2016-122774 filed on Jun. 21, 2016 which is incorporated herein by reference in its entirety including the specification, drawings and abstract.

BACKGROUND

1. Technical Field

The disclosure relates to a vehicle controller including an electric parking brake device.

2. Description of Related Art

An electric parking brake device that causes an electric motor to operate to activate a parking brake and mechanically gives a braking force to vehicle wheels without using a hydraulic pressure when an electric parking brake operating switch is operated while a vehicle is traveling is known (for example, Japanese Patent Application Publication No. 2001-187564 (JP 2001-187564 A)).

SUMMARY

However, according to the electric parking brake device, for example, when a driver erroneously operates an accelerator pedal instead of a brake pedal, there is a possibility of the vehicle starting with relatively high acceleration. More specifically, when a driver operates the electric parking brake operating switch again to release the electric parking brake in a state in which the driver has operated the electric parking brake operating switch to stop the vehicle and the vehicle has stopped due to a braking force generated by the operation, there is a possibility of the vehicle starting with relatively high acceleration if the accelerator pedal is still stepped on.
there is a possibility of the vehicle starting with relatively high acceleration if the accelerator pedal is still stepped on.

The disclosure provides a vehicle controller that can prevent a vehicle from starting with relatively high acceleration in the above-mentioned circumstances.

A first aspect of the disclosure relates to a vehicle controller which is applied to a vehicle including a drive source that generates a vehicle driving torque for causing the vehicle to travel and a braking device that applies a braking force to vehicle wheels of the vehicle. The vehicle controller includes: a braking force control unit configured to change the braking force which is applied to the vehicle wheels by the braking device; and a driving torque control unit configured to set the vehicle driving torque generated by the drive source to a first torque which varies depending on an operation level of an accelerator operator, wherein, when the vehicle is traveling and a switch for causing an electric parking brake to operate is operated in an accelerator ON state in which the accelerator operator operates, the braking force control unit is configured to apply the braking force to the vehicle wheels using the braking device and the driving torque control unit is configured to set the vehicle driving torque to a second torque which is smaller than the first torque, and then when a switch for releasing the electric parking brake is operated in a specific state in which the accelerator ON state is maintained and the vehicle has stopped, the braking force control unit is configured to continue to apply the braking force to the vehicle using the braking device and the driving torque control unit is configured to set the vehicle driving torque to the second torque.

A second aspect of the disclosure relates to a vehicle controller which is applied to a vehicle including a drive source that generates a vehicle driving torque for causing the vehicle to travel and a braking device that applies a braking force to vehicle wheels of the vehicle. The vehicle controller including: a first electronic control unit configured to change the braking force which is applied to the vehicle wheels by the braking device; and a second electronic control unit configured to set the vehicle driving torque generated by the drive source to a first torque which varies depending on an operation level of an accelerator operator, wherein, when the vehicle is traveling and a switch for causing an electric parking brake to operate is operated in an accelerator ON state in which the accelerator operator operates, the first electronic control unit is configured to apply the braking force to the vehicle wheels using the braking device and the second electronic control unit is configured to set the vehicle driving torque to a second torque which is smaller than the first torque, and then when the switch for releasing the electric parking brake is operated in a specific state in which the accelerator ON state is maintained and the vehicle has stopped, the first electronic control unit is configured to continue to apply the braking force to the vehicle using the braking device and the second electronic control unit is configured to set the vehicle driving torque to the second torque.

According to the aspect, it is possible to provide a vehicle controller that can prevent a vehicle from starting with relatively high acceleration.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment (Configuration)

Figure 1:
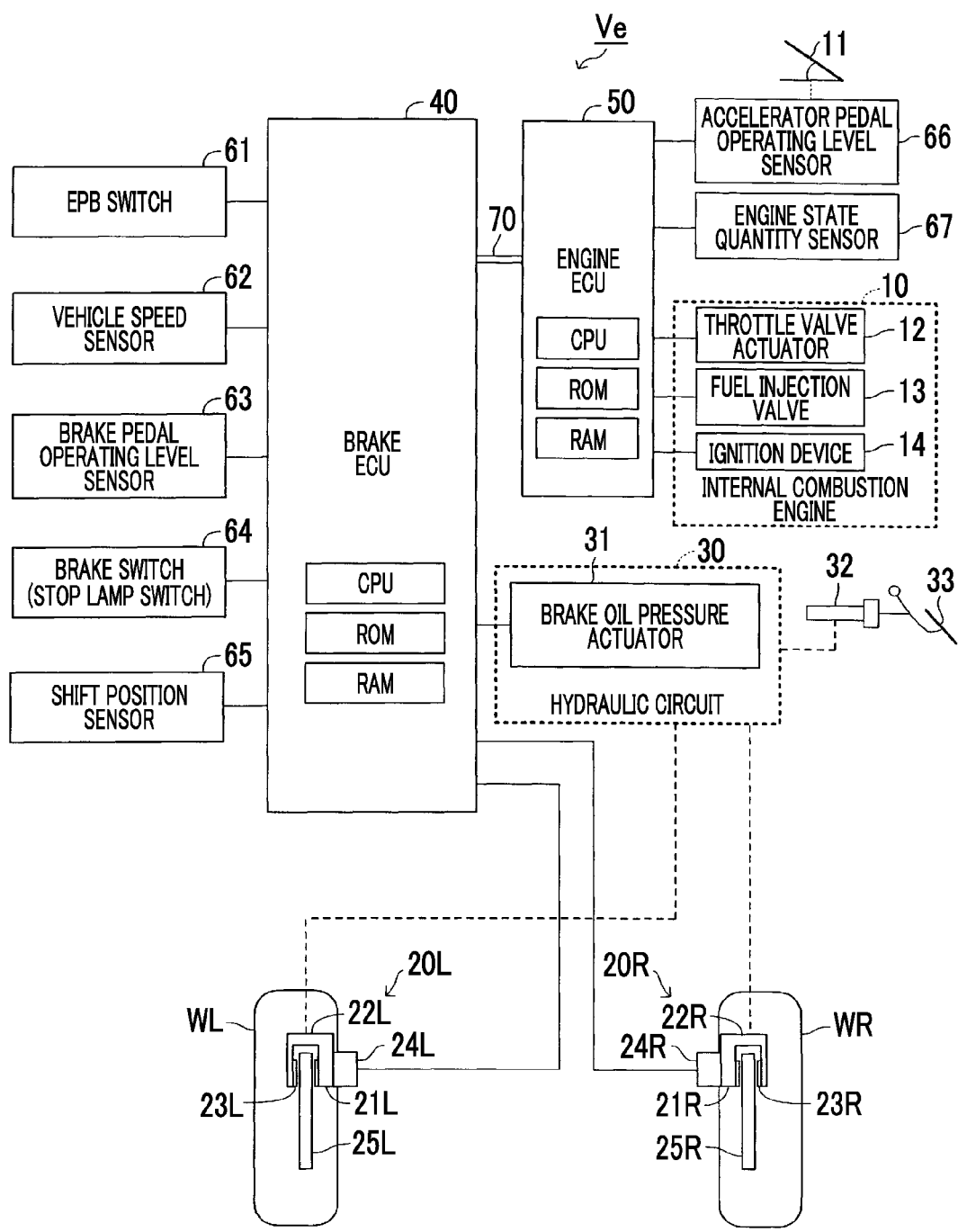
FIG. 1 is a diagram schematically illustrating a configuration of a vehicle controller according to a first embodiment of the disclosure and a vehicle employing the vehicle controller.

As illustrated in FIG. 1, a vehicle controller (hereinafter referred to as a "first controller") according to a first embodiment of the disclosure is applied to a vehicle Ve.

The vehicle Ve includes an internal combustion engine 10, an accelerator pedal 11, a left-rear wheel WL, a right-rear wheel WR, a left-rear wheel braking unit 20L, a right-rear wheel braking unit 20R, a hydraulic circuit 30 of a friction braking device, a master cylinder 32, and a brake pedal 33. The vehicle Ve includes a "left-front wheel, a right-front wheel, a left-front wheel braking unit, and a right-front wheel braking unit" which are not illustrated.

The internal combustion engine 10 is a drive source that generates a vehicle driving torque (a driving force) of the vehicle Ve. In this embodiment, the internal combustion engine 10 is a multi-cylinder spark-ignition gasoline-fuel four-stroke engine. The internal combustion engine 10 includes a throttle valve actuator 12 that changes an opening level of a throttle valve which is not illustrated, a fuel injection valve 13 that injects fuel into an intake manifold of each cylinder, and an ignition device 14 that ignites a spark in a combustion chamber of each cylinder.

The left-rear wheel braking unit (braking unit) 20L applies a braking force to the vehicle Ve by applying a frictional braking force to the left-rear wheel WL. The left-rear wheel braking unit 20L includes a wheel cylinder 21L, a brake caliper 22L, a brake pad 23L, an electric parking brake motor 24L, and a brake disk 25L. The wheel cylinder 21L is built into the brake caliper 22L.

The right-rear wheel braking unit (braking unit) 20R applies a braking force to the vehicle Ve by applying a frictional braking force to the right-rear wheel WR. The right-rear wheel braking unit 20R includes a wheel cylinder 21R, a brake caliper 22R, a brake pad 23R, an electric parking brake motor 24R, and a brake disk 25R. The wheel cylinder 21R is built into the brake caliper 22R.

In the following description, the left-rear wheel braking unit 20L and the right-rear wheel braking unit 20R are generically referred to as simply braking units 20. Similarly, the left-rear wheel WL and the right-rear wheel WR are generically referred to as rear wheels W, and the wheel cylinder 21L and the wheel cylinder 21R are generically referred to as wheel cylinders 21. The brake caliper 22L and the brake caliper 22R are generically referred to as calipers 22, and the brake pad 23L and the brake pad 23R are generically referred to as pads 23. The electric parking brake motor 24L and the electric parking brake motor 24R are generically referred to as EPB motors 24. EPB is an abbreviation of "Electric Parking Brake." The brake disk 25L and the brake disk 25R are generically referred to as disks 25.

The internal combustion engine 10 includes a "reservoir, an oil pump, and a plurality of valve units" which are not illustrated and a brake oil pressure actuator 31. The brake oil pressure actuator 31 includes an electric motor that drives the oil pump and a solenoid that switches opening levels of the plurality of valve units. The hydraulic circuit 30 is connected to the master cylinder 32.

A hydraulic pressure of a brake oil (hereinafter referred to as a "brake oil pressure") supplied to the wheel cylinder 21 is controlled by the master cylinder 32 and the brake oil pressure actuator 31.

The wheel cylinder 21 applies a frictional braking force to the rear wheel W by pressing the pad 23 disposed in the caliper 22 against the disk 25 rotating along with the rear wheel W depending on the brake oil pressure. Accordingly, the braking unit 20 can be said to include a hydraulic braking force generating mechanism that applies a braking force to the rear wheel W (vehicle wheel) depending on the hydraulic pressure of the brake oil supplied from the hydraulic circuit 30.

The EPB motor 24 applies a force for causing the pad 23 to move forward and backward relative to the disk 25 via a gear mechanism which is not illustrated. That is, when the EPB motor 24 rotates forward, the pad 23 is pressed against the disk 25 to apply a frictional braking force to the rear wheel W. This state may be referred to as an "EPB mechanical operating state (a mechanical parking brake operating state, a mechanically locked state)" in the following description. When the EPB motor 24 rotates reversely, the pad 23 is separated from the disk 25 and thus the frictional braking force applied to the rear wheel W is extinguished. That is, when the EPB motor 24 rotates reversely, the EPB mechanical operating state is released and switched to an "EPB mechanical non-operating state." Accordingly, the braking unit 20 can be said to include a mechanical parking braking mechanism that applies a braking force to the rear wheel W (vehicle wheel) depending on a rotational position of the EPB motor (electric motor) 24. The EPB motor 24, the gear mechanism, and the like are described in detail, for example, in PCT International Publication No. 2011/158855. The mechanical parking brake mechanism may be a mechanism which is described in JP 2001-187564 A.

A "left-front wheel, a right-front wheel, a left-front wheel braking unit, and a right-front wheel braking unit" which are not illustrated have the same configurations as the "left-rear wheel WL, the right-rear wheel WR, the left-rear wheel braking unit 20L, and the right-rear wheel braking unit 20R." Accordingly, the left-front wheel braking unit applies a frictional braking force to the left-front wheel by a hydraulic pressure of a brake oil supplied from the hydraulic circuit 30 to a wheel cylinder thereof. The right-front wheel braking unit applies a frictional braking force to the right-front wheel by a hydraulic pressure of a brake oil supplied from the hydraulic circuit 30 to a wheel cylinder thereof. The left-front wheel braking unit and the right-front wheel braking unit do not include an EPB motor. Accordingly, the left-front wheel braking unit and the right-front wheel braking unit cannot implement the EPB mechanical operating state.

A first controller includes a brake ECU 40, an engine ECU 50, an EPB operating switch 61, a vehicle speed sensor 62, a brake pedal operating level sensor 63, a brake switch 64, a shift position sensor 65, an accelerator pedal operating level sensor 66, and an engine state quantity sensor 67.

The brake ECU 40 and the engine ECU 50 are configured to exchange data with each other (to communicate with each other) via a communication/sensor-based controller area network (CAN) 70. Accordingly, both ECUs can acquire values of various flags and output values of sensors to be described later together. ECU is an abbreviation of Electric Control Unit which is an electronic control circuit including a microcomputer including a CPU, a ROM, a RAM, and an interface as major constituent elements. The CPU implements various functions to be described later by executing instructions (a routine or a program) stored in a memory (ROM).

The brake ECU 40 is connected to the EPB operating switch 61, the vehicle speed sensor 62, the brake pedal operating level sensor 63, the brake switch 64, and the shift position sensor 65 and receives signals therefrom.

The EPB operating switch (an electric parking brake operating switch) 61 is a switch that is disposed around a driver seat of the vehicle Ve and is operated by a driver to activate the electric parking brake or to deactivate the electric parking brake. When it is pressed by the driver in an OFF state, the EPB operating switch 61 is switched to an ON state and generates a signal indicating that effect. When it is pressed by the driver in the ON state, the EPB operating switch 61 is switched to the OFF state and generates a signal indicating that effect. The vehicle speed sensor 62 generates a signal indicating a speed (vehicle speed) SPD of the vehicle Ve.

The brake pedal operating level sensor 63 generates a signal BP indicating a degree of stepping on the brake pedal 33 (a brake pedal operating level) BR The brake switch (a stop lamp switch) 64 generates a signal of a low level when the brake pedal 33 is not stepped on, and generates a signal of a high level when the brake pedal 33 is stepped on (that is, when the brake pedal operating level BP is greater than "0").

The shift position sensor 65 generates a signal based on a position of a shift lever of an automatic gearshift of the vehicle Ve which is not illustrated. The position of the shift lever is referred to as a shift position, and includes a parking position (P range), a neutral position (N range), a driving position (D range), a first-speed position (first range), a second-speed position (second range), and a reversing position (R range). In this description, for the purpose of convenience, the P range and the N range are referred to as "non-driving positions", the D range, the first range, the second range, and the R range are referred to as "driving positions," and the D range, the first range, and the second range are referred to as "forward driving positions."

The brake ECU 40 is connected to the brake oil pressure actuator 31 and the EPB motor 24 and is configured to control (drive) them.

The engine ECU 50 is connected to the accelerator pedal operating level sensor 66 and the engine state quantity sensor 67 and is configured to receive signals therefrom.

The accelerator pedal operating level sensor 66 generates a signal AP indicating a degree of stepping on the accelerator pedal 11 (an accelerator pedal operating level) which is stepped on by the driver. The engine state quantity sensor 67 includes various sensors that generate signals indicating values of parameters (such as an intake air flow rate Ga, an engine rotation speed NE, a throttle valve opening level TA, and a coolant temperature THW) indicating an operating state of the internal combustion engine 10.

The engine ECU 50 is connected to the throttle valve actuator 12, the fuel injection valve 13, and the ignition device 14. The engine ECU 50 is configured to control a torque generated by the internal combustion engine 10 (a vehicle driving torque) by controlling (driving) them.

(Schematic Operation)

The schematic operation of the first controller will be described below. In general, in order to park the vehicle, a driver presses the EPB operating switch 61 to switch the EPB operating switch 61 from the OFF state to the ON state when the vehicle stops (that is, the vehicle speed SPD is "0") and the accelerator pedal 11 is not stepped on (accelerator pedal operating level AP=0, which is also referred to as "when an accelerator is turned off"). When the EPB operating switch 61 is switched from the OFF state to the ON state while the vehicle stops, the brake ECU 40 causes the EPB motor 24 to rotate forward. Accordingly, the pad 23 is pressed against the disk 25 and a frictional braking force is applied to the rear wheels W. That is, so-called, the parking brake operates (the EPB mechanical operating state is implemented). When the driver presses the EPB operating switch 61 to switch the EPB operating switch 61 from the ON state to the OFF state while the vehicle stops, the brake ECU 40 causes the EPB motor 24 to rotate reversely. Accordingly, the pad 23 is separated from the disk 25 and the frictional braking force applied to the rear wheels W is extinguished. That is, so-called, the parking brake is released (the EPB mechanical operating state is released and the EPB mechanical non-operating state is implemented).

For example, when the driver erroneously steps on the accelerator pedal 11 and thus the vehicle Ve travels at an increased vehicle speed (that is, while the vehicle travels), the driver may try to stop the vehicle using the parking brake. That is, the driver may switch the EPB operating switch 61 from the OFF state to the ON state when the vehicle is traveling and the accelerator pedal 11 is stepped on. In the following description, when the accelerator pedal 11 is stepped on (operated), that is, when the accelerator pedal operating level AP is greater than "0" may be referred to as "when the accelerator is turned on."

Figure 2:
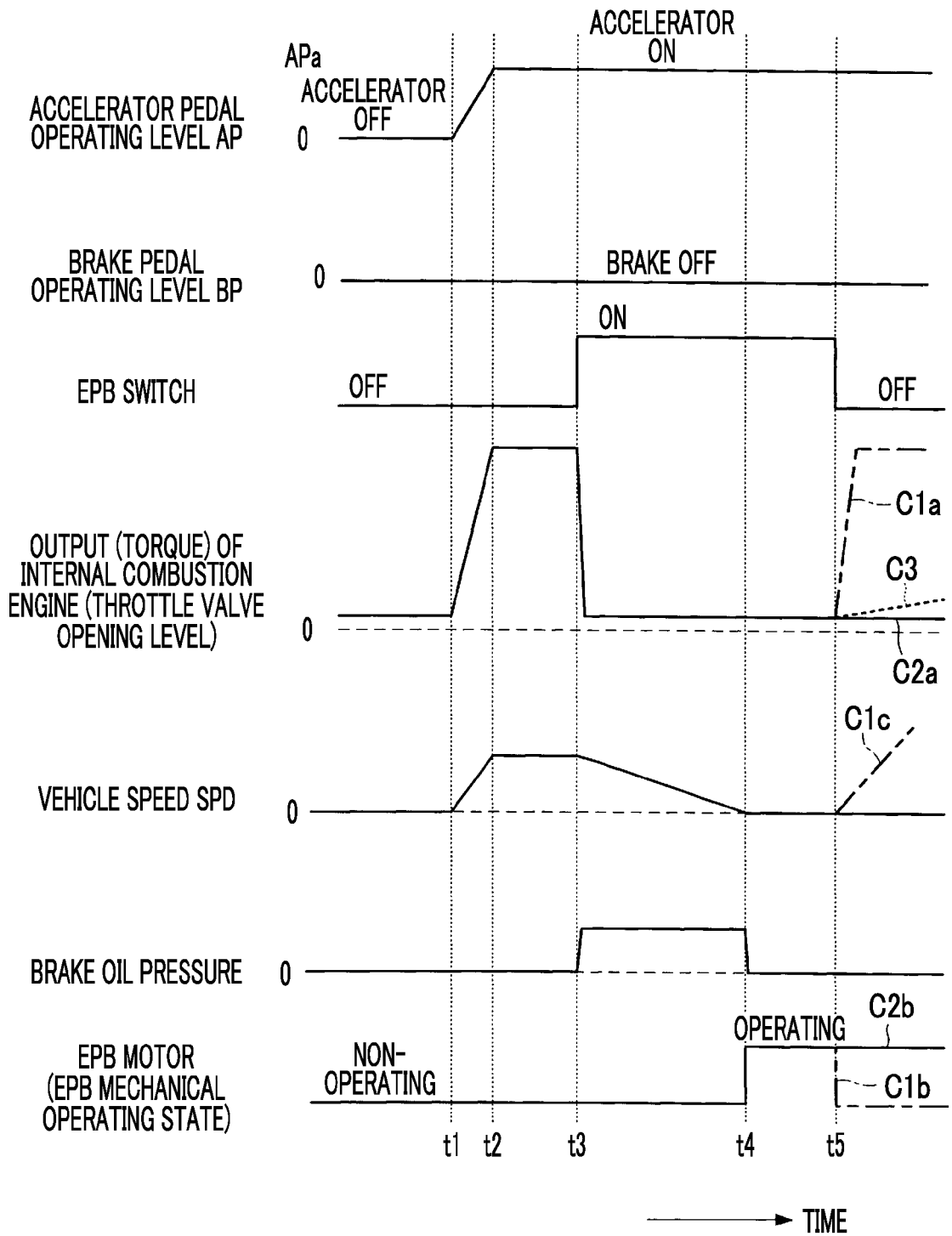
FIG. 2 is a timing chart illustrating operation of the vehicle controller illustrated in FIG. 1.

FIG. 2 is a timing chart illustrating variations of various parameters in the first controller in this case. In the example illustrated in FIG. 2, the accelerator pedal operating level AP increases from "0" at time t1, and is maintained at a constant value (APa) at time t2 or times subsequent thereto. That is, the vehicle is in an accelerator OFF state up to time t1, and is in an accelerator ON state at time t1 or times subsequent thereto.

On the other hand, the first controller determines a target throttle valve opening level TAtgt by applying an actual accelerator pedal operating level AP to a lookup table MapTatgt(AP). The first controller drives the throttle valve actuator 12 such that the actual throttle valve opening level TA matches the target throttle valve opening level TAtgt. As a result, the torque of the internal combustion engine 10 starts increasing at time t1, and is maintained at a substantially constant value at time t2 or times subsequent thereto. When the torque of the internal combustion engine 10 increases, the vehicle speed SPD starts increasing at time t1, and is maintained at a substantially constant value at time t2 or times subsequent thereto. In this way, the first controller switches the vehicle driving torque generated by the internal combustion engine 10 to a first torque which varies depending on the accelerator pedal operating level AP.

When this state is maintained, the driver operates the EPB operating switch 61 to switch the EPB operating switch 61 from the OFF state to the ON state at time t3. In general, a driver does not try use the parking brake when the accelerator is turned on. In this state, the driver erroneously steps on the accelerator pedal 11 instead of the brake pedal 33, and often tries to stop the vehicle Ve using the parking brake.

With the operation of the EPB operating switch 61, the first controller decreases the throttle valve opening level TA to a "throttle valve opening level (substantially zero) TAidle when an idling operation is performed." As a result, the torque of the internal combustion engine 10 decreases rapidly just after time t3. In this way, the first controller sets the vehicle driving torque generated by the internal combustion engine 10 to a second torque smaller than the first torque which varies depending on the accelerator pedal operating level AP. The first controller increases the brake oil pressure from "0" at time t3 and sets the brake oil pressure to a predetermined oil pressure.

Accordingly, the vehicle speed SPD starts decreasing at time t3 and reaches "0" at time t4. That is, the vehicle Ve stops at time t4. At this time, the first controller decreases the brake oil pressure to "0" and causes the EPB motor 24 to rotate forward to implement the EPB mechanical operating state.

Thereafter, in a state in which the accelerator ON state is maintained, at time t5, the driver operates the EPB operating switch 61 to switch the EPB operating switch 61 from the ON state to the OFF state. At this time, when the throttle valve opening level TA is changed based on the accelerator pedal operating level AP and the lookup table MapTAtgt(AP) to increase the torque of the internal combustion engine 10 as indicated by a one-dot chained line C1a and the EPB motor 24 is rotated reversely to release the EPB mechanical operating state as indicated by a one-dot chained line C1b, the vehicle Ve starts sudden acceleration as indicated by a one-dot chained line C1c. In this case, since there is a high possibility that the driver does not recognize that the accelerator pedal 11 is stepped on, such sudden acceleration may give apprehension and/or discomfort to the driver.

Therefore, at time t5 or times subsequent thereto, the first controller maintains the throttle valve opening level TA at a throttle valve opening level TAidle when an idling operation is performed as indicated by a solid line C2a. That is, the first controller maintains the vehicle driving torque generated by the internal combustion engine 10 at the second torque smaller than the first torque which varies depending on the accelerator pedal operating level AP. In other words, the first controller suppresses the torque (output) of the internal combustion engine 10 at time t5 or times subsequent thereto. The first controller maintains the EPB mechanical operating state without reversely rotating the EPB motor 24 as indicated by a solid line C2b.

In this case (that is, when the accelerator is turned on, the vehicle Ve stops while the EPB operating switch 61 is maintained in the ON state, and then the EPB operating switch 61 is switched from the ON state to the OFF state), the first controller checks whether the possibility that the accelerator pedal 11 is erroneously stepped on is extinguished based on the accelerator pedal operating level AP, releases the EPB mechanical operating state at the time point at which the possibility is extinguished, and increases the torque of the internal combustion engine 10 depending on the accelerator pedal operating level AP after the time point (changes the vehicle driving torque to the first torque). Hitherto, the schematic operation of the first controller has been described.

Figure 3:
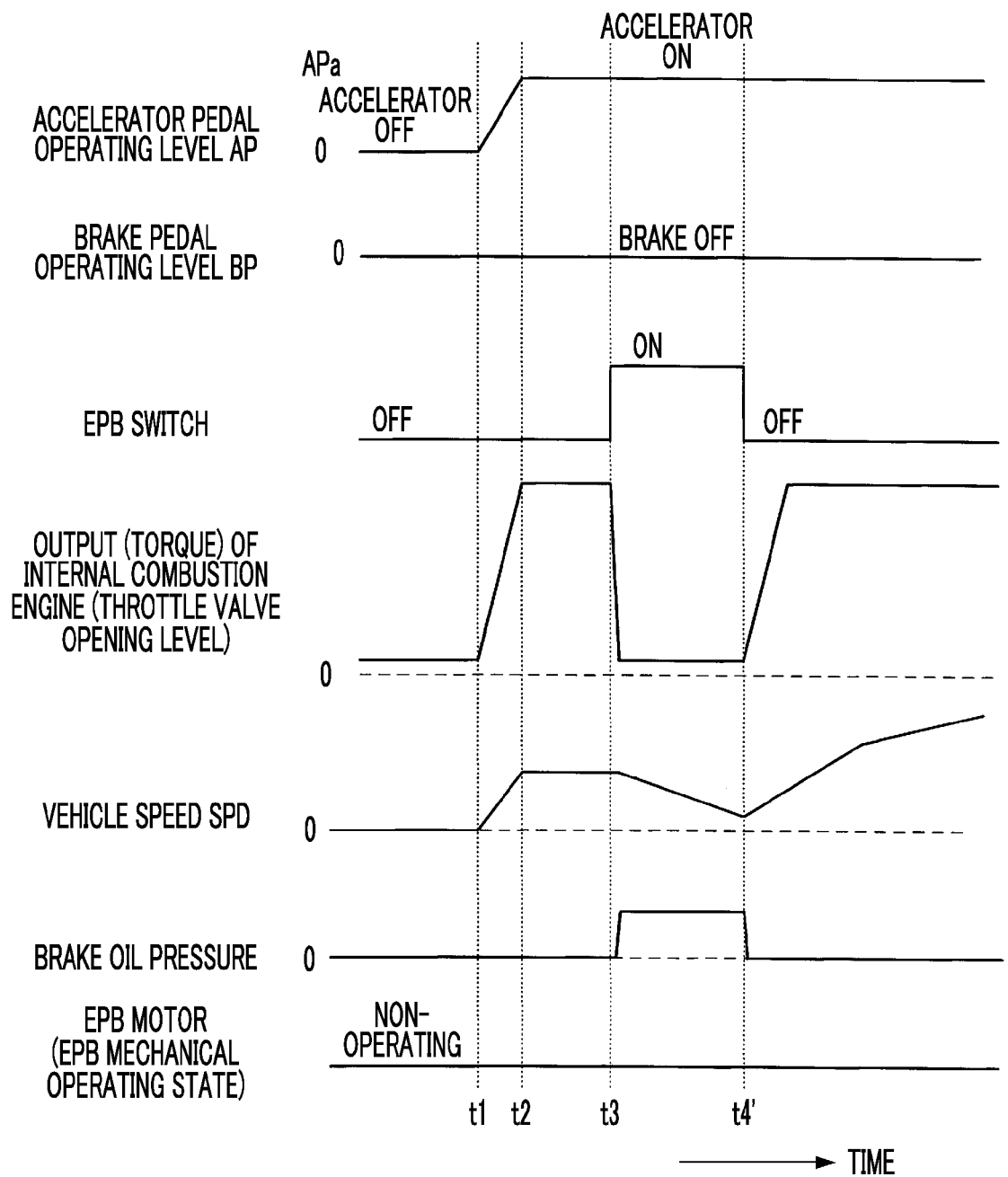
FIG. 3 is a timing chart illustrating operation of the vehicle controller illustrated in FIG. 1.

As illustrated at time t4' in FIG. 3, when the accelerator is turned on, the EPB operating switch 61 is maintained in the ON state, and the EPB operating switch 61 is switched from the ON state to the OFF state before the vehicle speed SPD reaches "0" (that is, while the vehicle is traveling), the first controller changes the throttle valve opening level TA based on the accelerator pedal operating level AP and the lookup table MapTAtgt(AP) to immediately increase the torque of the internal combustion engine 10 and to return the brake oil pressure to "0,"

(Specific Operation)

The specific operation of the first controller will be described below. A CPU of the engine ECU 50 (hereinafter referred to as an "engine CPU") performs a "throttle valve opening level control routine" illustrated in the flowchart of FIG. 4 whenever a predetermined time elapses.

Figure 4:
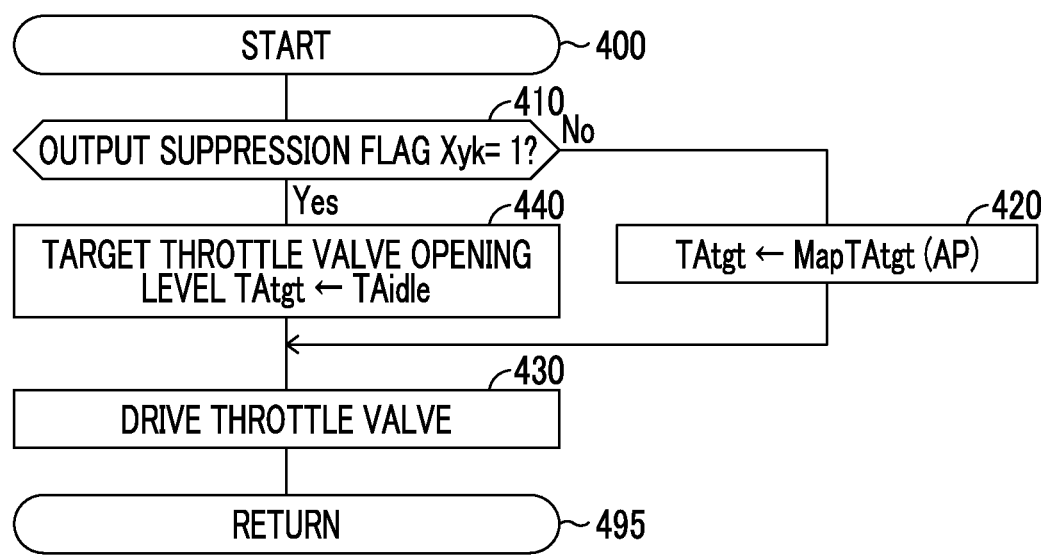
FIG. 4 is a flowchart illustrating a routine which is performed by a CPU (an engine CPU) of an engine ECU illustrated in FIG. 1.

At an appropriate timing, the engine CPU starts the routine at step 400 in FIG. 4, and determines whether a value of an output suppression flag Xyk is "1" in Step 410. The value of the output suppression flag Xyk is set to "0" in an initial routine which is not illustrated and which is performed by a CPU of the brake ECU 40 (hereinafter referred to as a "brake CPU") when an ignition key switch of the vehicle Ve which is not illustrated is switched from an OFF position to an ON position. The value of the output suppression flag Xyk is set to "1" when the output of the internal combustion engine 10 needs to be suppressed as will be described later.

When it is assumed that the value of the output suppression flag Xyk is "0," the engine CPU determines "NO" in Step 410 and determines the target throttle valve opening level TAtgt by applying the actual accelerator pedal operating level AP to the lookup table MapTAtgt(AP) in Step 420. Referring to the lookup table MapTAtgt(AP), the target throttle valve opening level TAtgt is determined to increase as the actual accelerator pedal operating level AP increases. When the actual accelerator pedal operating level AP is "0" (that is, when the accelerator is turned off), the target throttle valve opening level TAtgt determined with reference to the lookup table MapTAtgt(AP) is the idling throttle valve opening level TAidle which is very close to "0."

Then, in Step 430, the engine CPU drives the throttle valve actuator 12 such that the actual throttle valve opening level TA matches the target throttle valve opening level TAtgt. As a result, the internal combustion engine 10 generates a torque which increases as the accelerator pedal operating level AP increases (this torque is referred to as a "first torque" as described above for the purpose of convenience). Thereafter, the engine CPU transfers this routine to Step 495 and temporarily ends the routine.

On the other hand, when the value of the output suppression flag Xyk is "1," the engine CPU determines "YES" in Step 410 and sets the target throttle valve opening level TAtgt to the idling throttle valve opening level TAidle in Step 440. Then, the engine CPU performs the process of Step 430 and performs the process of Step S495. As a result, the torque of the internal combustion engine 10 becomes a very small torque which is generated when the idling operation is performed in the internal combustion engine 10 (this torque is also referred to as a "second torque" as described above for the purpose of convenience).

Figure 5:
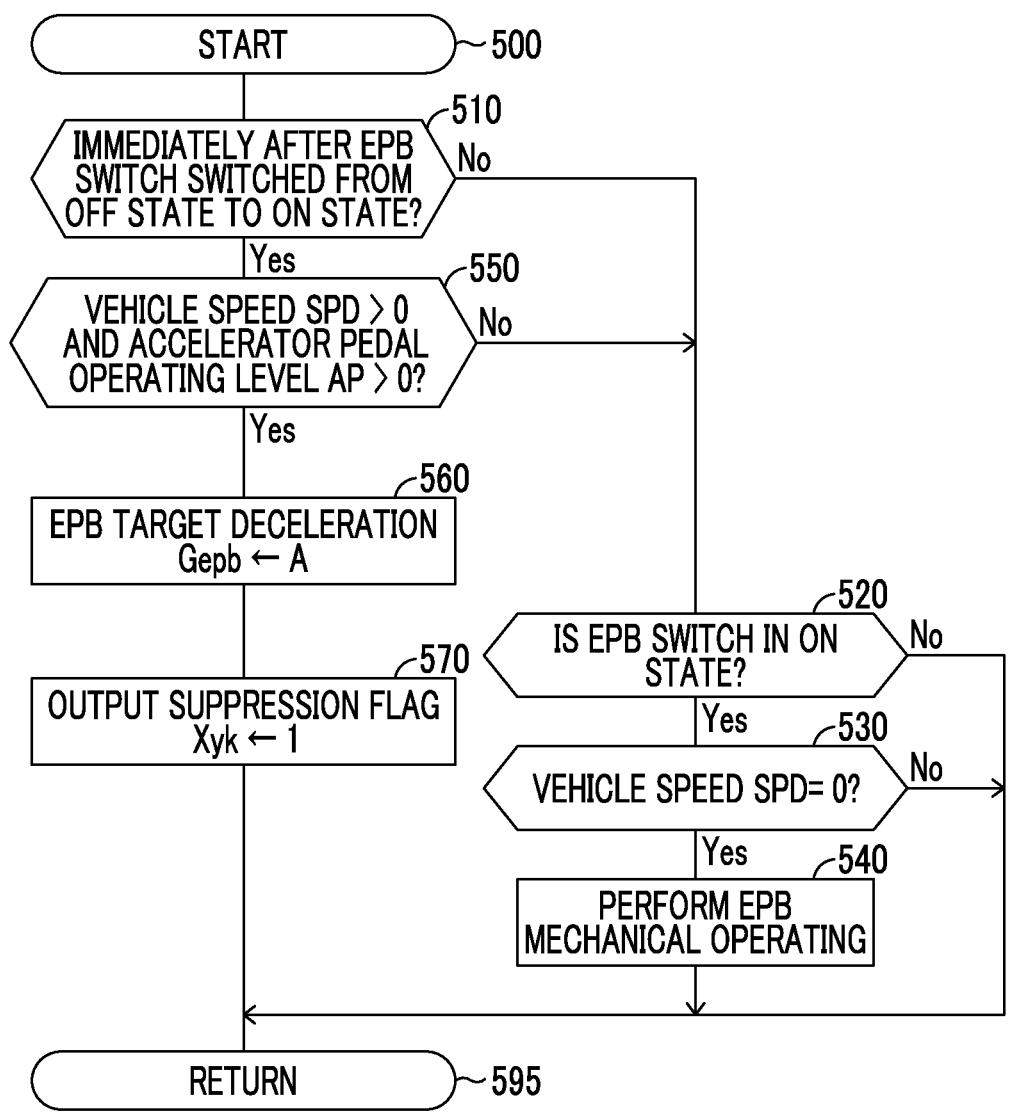
FIG. 5 is a flowchart illustrating a routine which is performed by a CPU (a brake CPU) of a brake ECU illustrated in FIG. 1.

On the other hand, the brake CPU performs a routine which is illustrated in the flowchart of FIG. 5 whenever a predetermined time elapses. Accordingly, at an appropriate timing, the brake CPU starts the routine in Step 500 of FIG. 5, and determines whether a current time point is immediately after the EPB operating switch 61 is switched from the OFF state to the ON state in Step 510.

When the current time point is not immediately after the EPB operating switch 61 is switched from the OFF state to the ON state, the brake CPU determines "NO" in Step 510, and determines whether the EPB operating switch 61 is in the ON state in Step 520.

When the EPB operating switch 61 is in the ON state, the brake CPU determines "YES" in Step 520, and determines whether the vehicle speed SPD detected by the vehicle speed sensor 62 is "0" in Step 530. When the vehicle speed SPD is "0" (that is, when the vehicle Ve stops), the brake CPU determines "YES" in Step 530 and applies a frictional braking force to the rear wheels W by causing the EPB motor 24 to rotate forward in Step 540. That is, the brake CPU implements the EPB mechanical operating state. When the EPB mechanical operating state is implemented already at the time point at which the brake CPU performs the process of Step 540, the brake CPU confirmatively performs the process of Step 540. Thereafter, the brake CPU transfers this routine to Step 595 and temporarily ends the routine.

On the other hand, when the EPB operating switch 61 is in the OFF state at the time point at which the brake CPU performs the process of Step 520, the brake CPU determines "NO" in Step 520, transfers this routine to Step 595, and temporarily ends the routine. When the vehicle speed SPD is not "0" at the time point at which the brake CPU performs the process of Step 530, the brake CPU determines "NO" in Step 530, transfers this routine to Step 595, and temporarily ends the routine.

When the current time point is immediately after the EPB operating switch 61 is switched from the OFF state to the ON state, the brake CPU determines "YES" in Step 510, and determines whether the vehicle speed SPD is higher than "0" and the accelerator pedal operating level AP is greater than "0" (that is, whether the vehicle is traveling and the accelerator is turned on) in Step 550.

When the vehicle speed SPD is "0" or the accelerator pedal operating level AP is "0," the brake CPU determines "NO" in Step 550 and performs the processes of Step 520 or steps subsequent thereto.

On the other hand, when the vehicle is traveling and the accelerator is turned on at the time point at which the brake CPU performs the process of Step 550, the brake CPU determines "YES" in Step 550, sequentially performs the processes of Step 560 and Step 570 to be described below, transfers this routine to Step 595, and temporarily ends the routine.

In Step 560, the brake CPU sets a value of EPB target deceleration Gepb to a value A (A<0). Accordingly, as will be described later, a braking force is applied to the vehicle wheel W using the hydraulic braking force generating mechanism. In Step 570, the brake CPU sets the value of the output suppression flag Xyk to "1." As a result, since the engine CPU performs the process of Step 440 in FIG. 4, the throttle valve opening level TA is set to the idling throttle valve opening level TAidle. Accordingly, the torque of the internal combustion engine 10 (that is, the output of the internal combustion engine 10) is suppressed. That is, the vehicle driving torque is set to the second torque.

Figure 6:
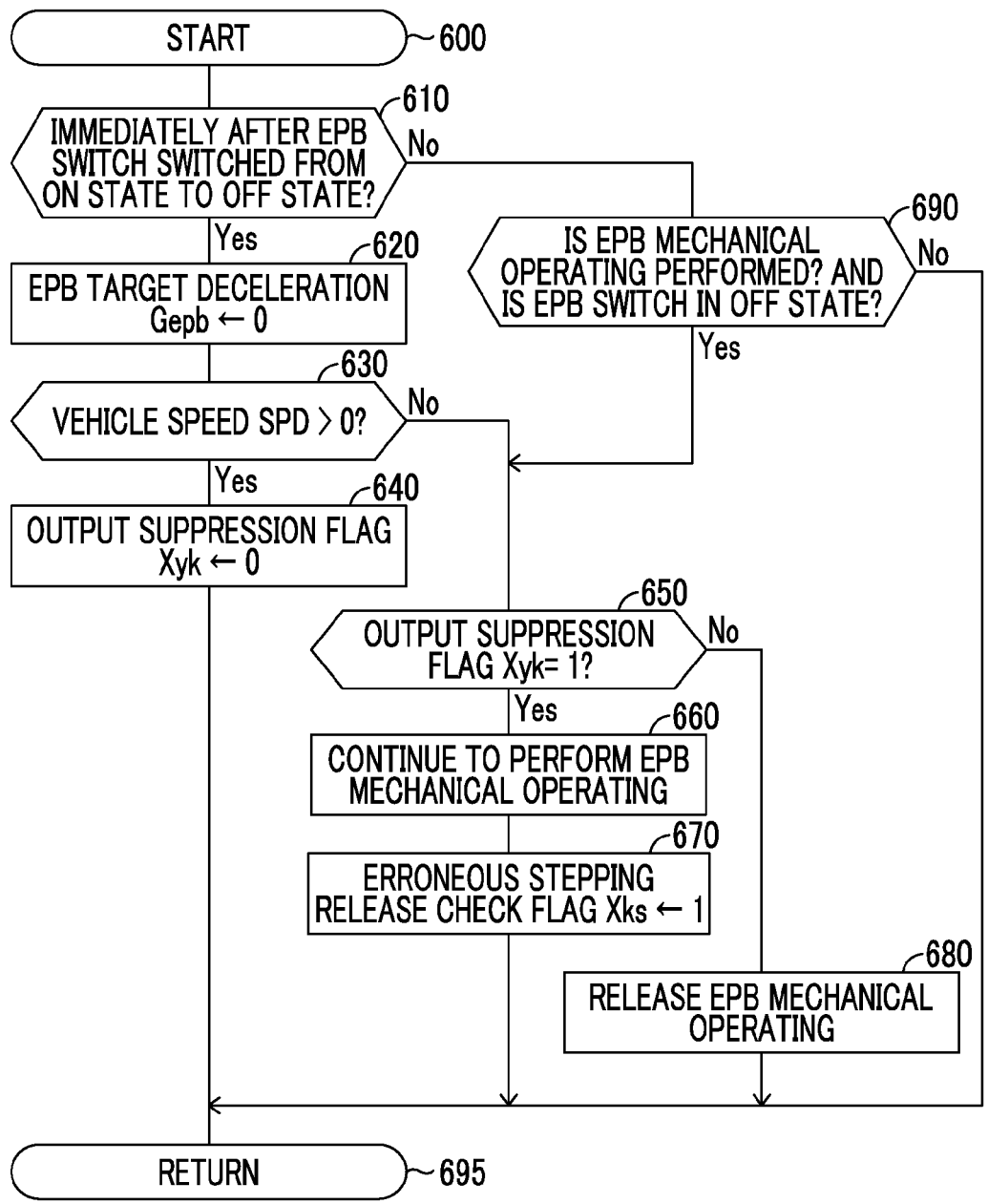
FIG. 6 is a flowchart illustrating a routine which is performed by the CPU (the brake CPU) of the brake ECU illustrated in FIG. 1.

The brake CPU performs a routine which is illustrated in the flowchart of FIG. 6 whenever a predetermined time elapses. Accordingly, at an appropriate timing, the brake CPU starts the routine in Step 600 of FIG. 6, and determines whether a current time point is immediately after the EPB operating switch 61 is switched from the ON state to the OFF state in Step 610.

When the current time point is not immediately after the EPB operating switch 61 is switched from the ON state to the OFF state, the brake CPU determines "YES" in Step 610, and sets the value of the EPB target deceleration Gepb to "0" in Step 620.

Subsequently, in Step 630, the brake CPU determines whether the vehicle speed SPD detected using the vehicle speed sensor 62 is higher than "0." When the vehicle speed SPD is higher than "0" (that is, when the vehicle Ve is traveling), the brake CPU determines "YES" in Step 630, sets the value of the output suppression flag Xyk to "0" in Step 640, transfers this routine to Step 695, and temporarily ends the routine. As a result, since the engine CPU performs the process of Step 420 in FIG. 4, the throttle valve opening level TA is changed to the throttle valve opening level which is determined based on the accelerator pedal operating level AP and the lookup table MapTAtgt(AP). That is, the suppression of the torque of the internal combustion engine 10 (that is, the output of the internal combustion engine 10) is released and the vehicle driving torque is returned to the first torque.

On the other hand, when the vehicle speed SPD is "0" (that is, when the vehicle Ve stops) at the time point at which the brake CPU performs the process of Step 630, the brake CPU determines "NO" in Step 630, and determines whether the value of the output suppression flag Xyk is "1" in Step 650.

When the value of the output suppression flag Xyk is "1," it is preferable that the torque of the internal combustion engine 10 be maintained until it is confirmed that the possibility of erroneously stepping on the accelerator pedal 11 is extinguished. Therefore, the brake CPU determines "YES" in Step 650, sequentially performs the processes of Step 660 and Step 670 to be described below, transfers this routine to Step 695, and temporarily ends the routine.

In Step 660, the brake CPU maintains the EPB motor 24 at the rotational position at that time without rotating reversely. As a result, since the frictional braking force is continuously applied to the rear wheel W, and the EPB mechanical operating state is maintained.

In Step 670, the brake CPU sets a value of an erroneous stepping release check flag Xks to "1." The value of the erroneous stepping release check flag Xks is set to "0" in the above-mentioned initial routine. The value of the erroneous stepping release check flag Xks is set to "0" when it is confirmed that the possibility of erroneously stepping on the accelerator pedal 11 is extinguished as will be described later (see Step 740 to be described later).

On the other hand, when the value of the output suppression flag Xyk is "0" at the time point at which the brake CPU performs the process of Step 650, it is not necessary to continuously suppress the torque of the internal combustion engine 10. Therefore, the brake CPU determines "NO" in Step 650, and extinguishes the frictional braking force applied to the rear wheel W by causing the EPB motor 24 to rotate reversely in Step 680. That is, the brake CPU implements the EPB mechanical non-operating state by releasing the EPB mechanical operating state. Thereafter, the brake CPU transfers this routine directly to Step 695 and temporarily ends the routine.

When the current time point is not immediately after the EPB operating switch 61 is switched from the ON state to the OFF state, the brake CPU determines "NO" in Step 610 and determines whether the EPB operates mechanically (the EPB mechanical operating state is maintained) and the EPB operating switch 61 is in the OFF state in Step 690.

When the EPB operates mechanically and the EPB operating switch 61 is in the OFF state, the brake CPU determines "YES" in Step 690 and then performs the process of Step 650. Accordingly, the EPB mechanical operating state is maintained in Step 660 when the value of the output suppression flag Xyk is "1," and the EPB mechanical operating state is released in Step 680 when the value of the output suppression flag Xyk is "0." When the EPB does not operate mechanically or the EPB operating switch 61 is not in the OFF state, the brake CPU determines "NO" in Step 690, transfers this routine directly to Step 695, and temporarily ends the routine.

Figure 7:
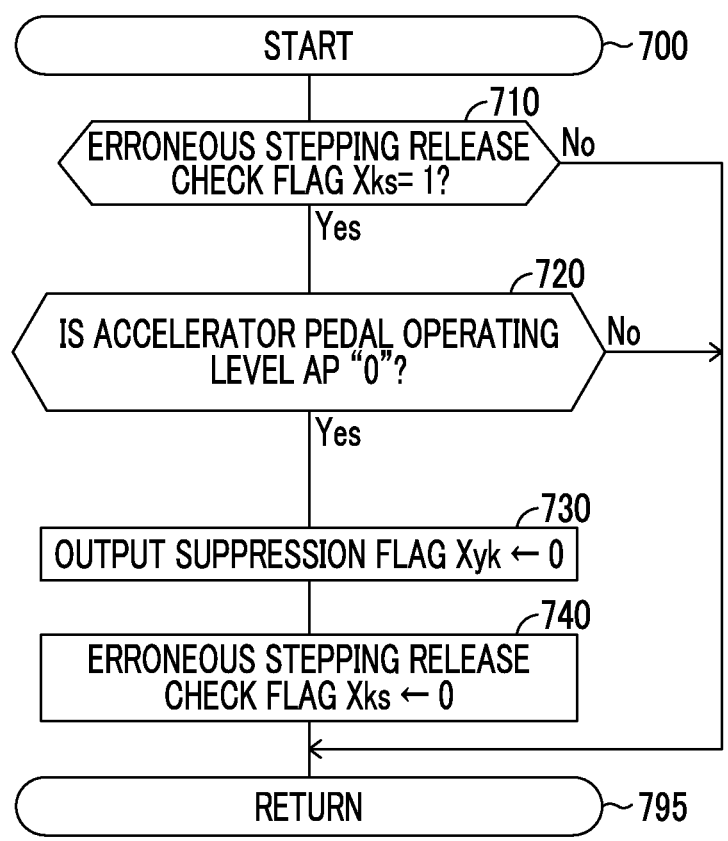
FIG. 7 is a flowchart illustrating a routine which is performed by the CPU (the brake CPU) of the brake ECU illustrated in FIG. 1.

The brake CPU performs a routine which is illustrated in the flowchart of FIG. 7 whenever a predetermined time elapses. Accordingly, at an appropriate timing, the brake CPU starts the routine in Step 700 in FIG. 7, and determines whether the value of the erroneous stepping release check flag Xks is "1" in Step 710. When the value of the erroneous stepping release check flag Xks is not "1," the brake CPU determines "NO" in Step 710, transfers this routine directly to Step 795, and temporarily ends the routine.

On the other hand, when the value of the erroneous stepping release check flag Xks is "1," the brake CPU determines "YES" in Step 710, and determines whether the possibility of erroneously stepping on the accelerator pedal 11 is extinguished by determining whether the accelerator pedal operating level AP is returned from a positive value to "0" (that is, whether the accelerator pedal operating level AP is "0") in Step 720.

When the accelerator pedal operating level AP is maintained at the positive value, the brake CPU determines "NO" in Step 720, transfers this routine directly to Step 795, and temporarily ends the routine.

On the other hand, when the accelerator pedal operating level AP is returned from the positive value to "0," it can be determined that the possibility of erroneously stepping on the accelerator pedal 11 is extinguished and thus the brake CPU determines "YES" in Step 720, sequentially performs the processes of Step 730 and Step 740 to be described below, and transfers the routine to Step 795.

In Step 730, the value of the output suppression flag Xyk is set (returned) to "0." As a result, since the brake CPU determines "NO" in Step 650 and performs the process of Step 680, the EPB mechanical operating state is released. Since the engine CPU determines "NO" in Step 410 and performs the process of Step 420, the vehicle driving torque is returned to the first torque. In Step 740, the value of the erroneous stepping release check flag Xks is set (returned) to "0."

Figure 8:
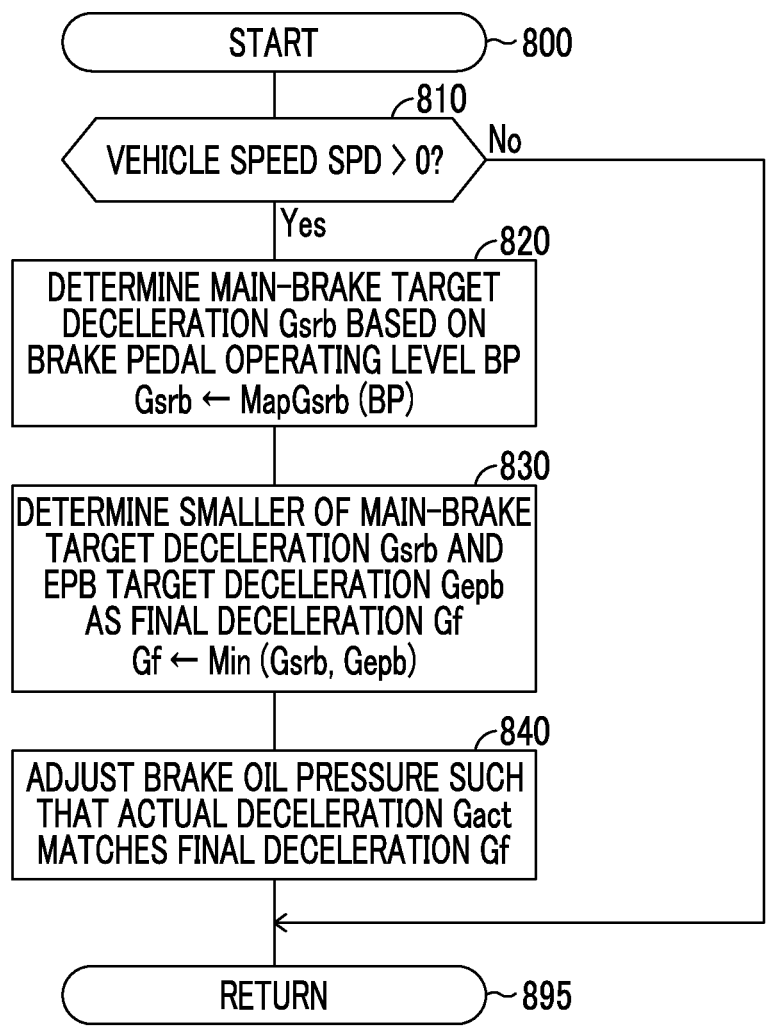
FIG. 8 is a flowchart illustrating a routine which is performed by the CPU (the brake CPU) of the brake ECU illustrated in FIG. 1.

The brake CPU performs a routine which is illustrated in the flowchart of FIG. 8 whenever a predetermined time elapses. Accordingly, at an appropriate timing, the brake CPU starts the routine in Step 800 in FIG. 8, and determines whether the vehicle speed SPD detected by the vehicle speed sensor 62 is higher than "0" in Step 810.

When the vehicle speed SPD is higher than "0" (that is, when the vehicle Ve is traveling), the brake CPU determines "YES" in Step 810, sequentially performs the processes of Steps 820 to 840, transfers this routine to Step 895, and temporarily ends the routine.

In Step 820, the brake CPU determines a main-brake target deceleration Gsrb by applying the brake pedal operating level BP to a lookup table MapGsrb(BP). Referring to the lookup table MapGsrb(BP), the main-brake target deceleration Gsrb is determined to be a negative value of which the absolute value increases as the brake pedal operating level BP increases.

In Step 830, the brake CPU determines (selects) the smaller deceleration (which has a negative value with a larger absolute value) of the main-brake target deceleration Gsrb and the EPB target deceleration Gepb as the final deceleration Gf.

In Step 840, the brake CPU adjusts the brake oil pressure by controlling the brake oil pressure actuator 31 such that the actual deceleration Gact matches the final deceleration Gf. As a result, the deceleration of the vehicle Ve matches the final deceleration Gf. That is, the braking force is applied to the vehicle wheel using the hydraulic braking force generating mechanism.

On the other hand, when the vehicle speed SPD is "0" (that is, the vehicle Ve stops) at the time point at which the brake CPU performs the process of Step 810, the brake CPU determines "NO" in Step 810, transfers this routine directly to Step 895, and temporarily ends the routine. In this case, when the brake pedal 33 is operated, a control oil pressure has a value corresponding to the pressure of the master cylinder.

As described above, when the EPB operating switch 61 is switched from the OFF state to the ON state when the vehicle is traveling and the accelerator is turned on (see Step 510 and Step 550), the first controller brakes the vehicle Ve using the hydraulic braking force generating mechanism that applies a braking force to the vehicle wheel W depending on the hydraulic pressure of the brake oil supplied from the hydraulic circuit 30 by setting the EPB target deceleration Gepb to the value A (Step 560). The first controller sets the torque (the vehicle driving torque), which is generated by the internal combustion engine 10 at the time point at which such a state is generated, to a torque (the second torque) smaller than the torque (the first torque) when such a state is not generated (Step 570, the determination of "YES" in Step 410, and Steps 440 and 430).

Thereafter, when such a state is maintained and the vehicle Ve stops with the braking force generated by the hydraulic braking force generating mechanism, the first controller implements the EPB mechanical operating state using the mechanical parking brake mechanism (Step 540). When the EPB operating switch 61 is switched from the ON state to the OFF state in that state, the first controller maintains the EPB mechanical operating state (Step 660) until the value of the output suppression flag Xyk is set to "0" (see Step 650), and maintains the torque (the vehicle driving torque) generated by the internal combustion engine 10 to a small value (the second torque smaller than the first torque) (determination of "YES" in Step 410, Steps 440 and 430).

When the accelerator pedal operating level AP is "0" in that state, the first controller sets the value of the output suppression flag Xyk to "0" (Steps 720 and 730), thus releases the EPB mechanical operating state (Step 680), and returns the torque (the vehicle driving torque) generated by the internal combustion engine 10 to the first torque in the normal state (determination of "NO" in Step 410, Steps 420 and 430).

Accordingly, even when the driver switches the EPB operating switch 61 to the ON state to stop the vehicle Ve and then the driver switches the EPB operating switch 61 to the OFF state while maintaining the accelerator ON state, it is possible to prevent the vehicle Ve from starting suddenly.
(Modified Example of First Controller)

A modified example of the first controller will be described below. When the EPB operating switch 61 is switched from the ON state to the OFF state in a state in which the vehicle stops and the value of the output suppression flag Xyk is "1," the first controller suppresses an increase of the torque of the internal combustion engine 10 by maintaining the throttle valve opening level TA at the idling throttle valve opening level TAidle. On the other hand, the modified example of the first controller suppresses an increase of the torque of the internal combustion engine 10 by slowly increasing the throttle valve opening level TA from the idling throttle valve opening level TAidle when the EPB operating switch 61 is switched from the ON state to the OFF state in a state in which the vehicle stops and the value of the output suppression flag Xyk is "1" as indicated by a dotted line C3 in FIG. 2. The increasing rate of the throttle valve opening level TA in this case is lower than the increasing rate of the throttle valve opening level TA "when the throttle valve opening level TA is immediately returned to the throttle valve opening level determined based on the accelerator pedal operating level AP and the lookup table MapTAtgt(AP) from the idling throttle valve opening level TAidle."

More specifically, the brake CPU of the modified example performs the same process as the brake CPU of the first controller. On the other hand, the engine CPU of the modified example performs a routine which is illustrated in the flowchart of FIG. 9 instead of the routine of FIG. 4 whenever a predetermined time elapses.

Figure 9:
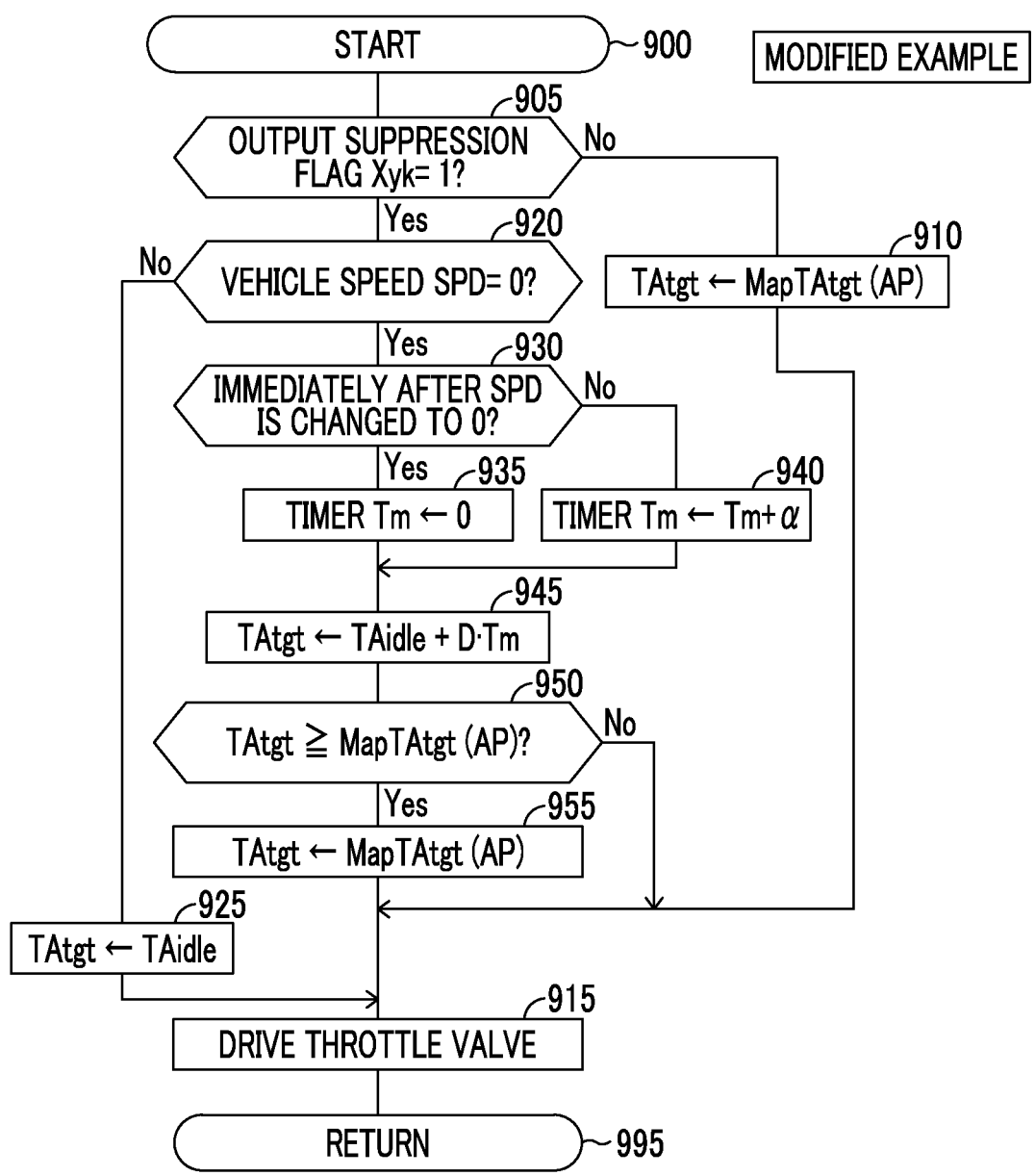
FIG. 9 is a flowchart illustrating a routine which is performed by a CPU of a brake ECU according to a modified example of the vehicle controller illustrated in FIG. 1.

Accordingly, at an appropriate timing, the CPU starts the routine in Step 900 in FIG. 9, and determines whether the value of the output suppression flag Xyk is "1" in Step 905.

When it is assumed that the value of the output suppression flag Xyk is "0," the engine CPU determines "NO" in Step 905, and determines the target throttle valve opening level TAtgt by applying the actual accelerator pedal operating level AP to the lookup table MapTAtgt(AP) in Step 910.

Then, in Step 915, the engine CPU drives the throttle valve actuator 12 such that the actual throttle valve opening level TA matches the target throttle valve opening level TAtgt. As a result, the internal combustion engine 10 generates a torque (the first torque) which increases as the accelerator pedal operating level AP increases. Thereafter, the engine CPU transfers this routine to Step 995 and temporarily ends the routine.

On the other hand, when the value of output suppression flag Xyk is "1," the engine CPU determines "YES" in Step 905, and determines whether the vehicle speed SPD detected by the vehicle speed sensor 62 is "0" in Step 920. When the vehicle speed SPD is not "0" (that is, when the vehicle Ve is traveling), the engine CPU determines "NO" in Step 920, and sets the target throttle valve opening level TAtgt to the idling throttle valve opening level TAidle in Step 925. Then, the engine CPU performs the process of Step 915 and then transfers the routine to Step 995. As a result, the torque of the internal combustion engine 10 is set to a very small torque (the second torque) which is generated when the internal combustion engine 10 performs an idling operation.

On the other hand, when the vehicle speed SPD is "0" (that is, the vehicle Ve stops) at the time point at which the engine CPU performs the process of Step 920, the engine CPU determines "YES" in Step 920, and determines whether the current time point is "immediately after the vehicle speed SPD is changed to "0"" in Step 930.

When the current time point is "immediately after the vehicle speed SPD is changed to "0,"" the engine CPU determines "YES" in Step 930, and sets a timer Tm to "0" in Step 935. Thereafter, the engine CPU performs the process of Step 945.

When the current time point is not "immediately after the vehicle speed SPD is changed to "0,"" the engine CPU determines "NO" in Step 930, and sets the timer Tm to a "value obtained by adding a constant value a to the value of the timer Tm at that time" in Step 940. Thereafter, the engine CPU performs the process of Step 945. As can be understood from the above description, the timer Tm is a timer that indicates the time elapsed from the time point at which the vehicle stops when the value of the output suppression flag Xyk is "1."

The engine CPU sets the target throttle valve opening level TAtgt to a value obtained by adding a "product of a constant value D and the timer Tm (=D·Tm)" to the idling throttle valve opening level TAidle in Step 945. As a result, the target throttle valve opening level TAtgt increases slowly with the lapse of time from the time point at which the vehicle stops when the value of the output suppression flag Xyk is 1." Accordingly, the torque (the vehicle driving torque) of the internal combustion engine 10 increases slowly. The vehicle driving torque set in this way is also referred to as the "second torque" for the purpose of convenience.

Subsequently, in Step 950, the engine CPU determines whether the target throttle valve opening level TAtgt is equal to or greater than the "target throttle valve opening level determined by applying the accelerator pedal operating level AP at the current time point to the lookup table MapTAtgt (AP)."

When the determination condition of Step 950 is not satisfied, the engine CPU determines "NO" in Step 950 and transfers the routine directly to step 915. On the other hand, when the determination condition of Step 950 is satisfied, the engine CPU determines "YES" in Step 950, and sets the target throttle valve opening level TAtgt to the "target throttle valve opening level determined by applying the accelerator pedal operating level AP at the current time point to the lookup table MapTAtgt(AP)" in step 955. That is, the target throttle valve opening level TAtgt calculated in Step 945 is limited not to exceed the "target throttle valve opening level determined by applying the accelerator pedal operating level AP at the current time point to the lookup table MapTAtgt(AP)." Thereafter, the engine CPU transfers the routine to Step 915.

As described above, according to the modified example of the first controller, even when the driver stops the vehicle Ve by turning on the EPB operating switch 61 and then the driver switches the EPB operating switch 61 to the OFF state while maintaining the accelerator ON state, the EPB mechanical operating state is maintained and the vehicle driving torque increases slowly from the very small value. Accordingly, it is possible to prevent the vehicle from starting suddenly.

Second Embodiment

A vehicle controller according to a second embodiment of the disclosure (hereinafter referred to as a "second controller") will be described below. The second controller is different from the first controller in the following points.
(Different 1)
When setting the value of the output suppression flag Xyk to "1," the brake CPU determines whether there is a "possibility of erroneously operating (erroneously stepping on) the accelerator pedal," and sets the value of the output suppression flag Xyk to "1" when it is determined that there is the possibility.
(Difference 2)
When setting the value of the output suppression flag Xyk to "0," the brake CPU determines whether the "possibility of erroneously operating (erroneously stepping on) the accelerator pedal is extinguished" and sets the value of the output suppression flag Xyk to "0" when it is determined that the possibility is extinguished.

The differences will be described below. In the following description, steps in which the same processes as the steps described above will be referenced by the same reference signs as described above and detailed description thereof will not be repeated.

Figure 10:
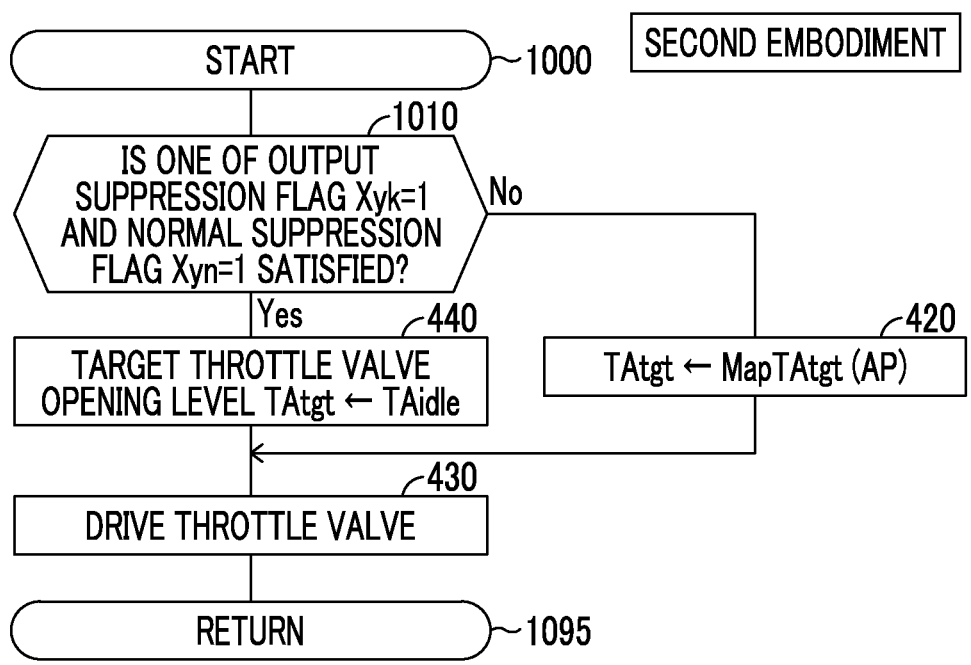
FIG. 10 is a flowchart illustrating a routine which is performed by a CPU (an engine CPU according to a second embodiment) of an engine ECU of a vehicle controller according to a second embodiment of the disclosure.

The engine CPU of the second controller performs a routine illustrated in FIG. 10 whenever a predetermined time elapses. This routine is the same as the routine illustrated in FIG. 4, except that Step 410 of the routine illustrated in FIG. 4 is replaced with Step 1010. That is, when the routine starts from Step 1000 and then Step 1010 is performed, the engine CPU determines whether at least one condition of a "condition in which the value of the output suppression flag Xyk is "1" and a condition in which a value of a normal suppression flag Xyn is "1" is satisfied in Step 1010.

The value of the normal suppression flag Xyn is set to "0" in the initial routine which is not illustrated and which is performed by the brake CPU. The value of the normal suppression flag Xyn is set to "1" when the output of the internal combustion engine 10 needs to be suppressed as will be described later.

When the value of at least one of the output suppression flag Xyk and the normal suppression flag Xyn is "1," the engine CPU performs Step 440. Accordingly, when the value of at least one of the output suppression flag Xyk and the normal suppression flag Xyn is "1," the throttle valve opening level TA is changed to the idling throttle valve opening level TAidle. As a result, the torque (the vehicle driving torque) of the internal combustion engine 10 is suppressed to a very small torque (the second torque).

On the other hand, when both values of the output suppression flag Xyk and the normal suppression flag Xyn is "0," the engine CPU determines "NO" in Step 1010 and performs Step 420. As a result, the throttle valve opening level TA is changed to a throttle valve opening level which is determined based on the accelerator pedal operating level AP and the lookup table MapTAtgt(AP). That is, the suppression of the torque (thus the output of the internal combustion engine 10) of the internal combustion engine 10 is released and the vehicle driving torque is set to the first torque.

Figure 11:
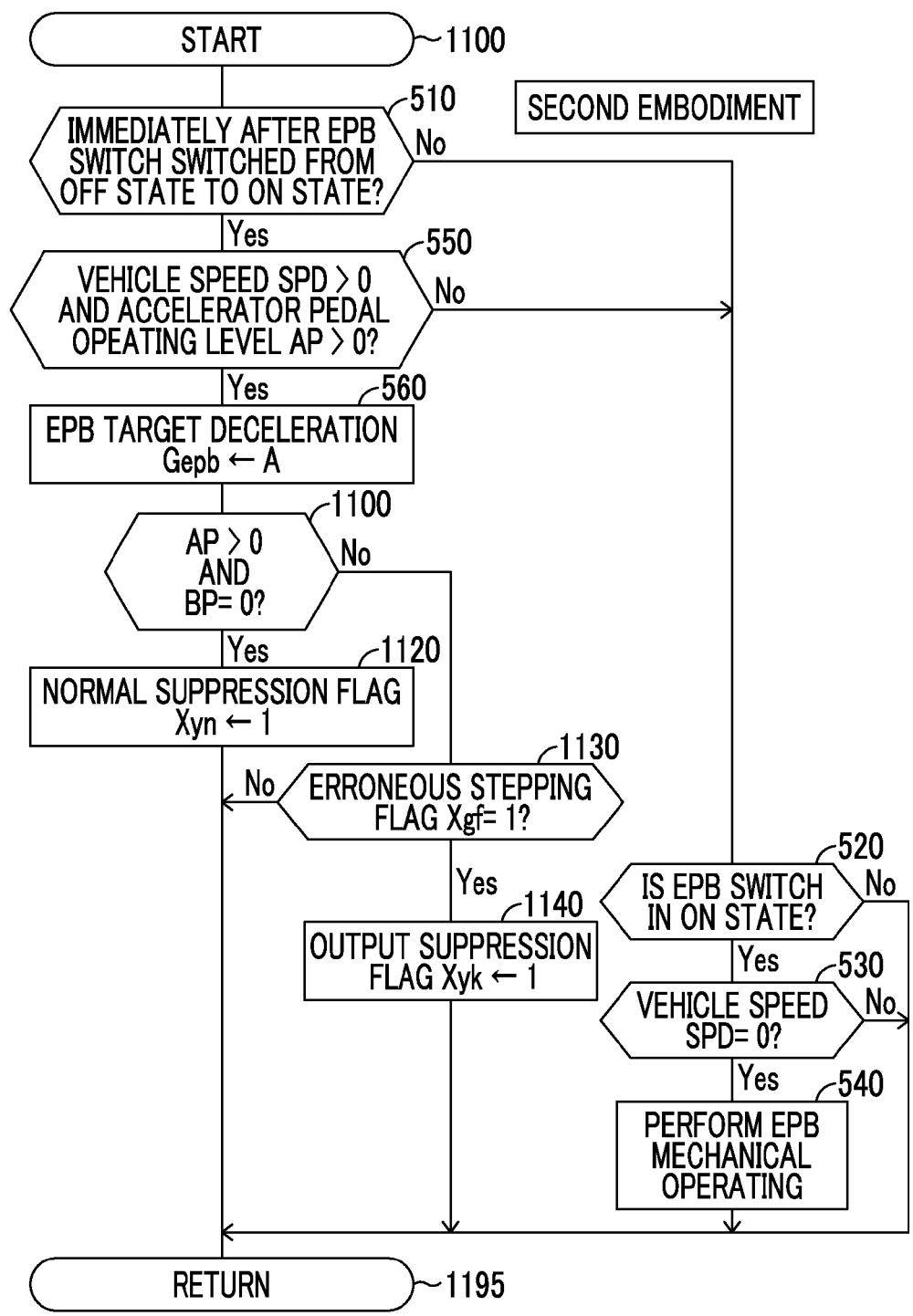
FIG. 11 is a flowchart illustrating a routine which is performed by a CPU (a brake CPU according to the second embodiment) of a brake ECU of the vehicle controller according to the second embodiment of the disclosure.

The brake CPU of the second controller performs a routine illustrated in FIG. 11 whenever a predetermined time elapses. This routine is the same as the routine illustrated in FIG. 5, except that Step 570 of the routine illustrated in FIG. 5 is replaced with Steps 1110 to 1140.

More specifically, when the current time point is "immediately after the EPB operating switch 61 is switched from the OFF state to the ON state" (see the determination of "YES" in Step 510) and the vehicle speed SPD is higher than "0", and the accelerator pedal operating level AP is greater than "0" (see the determination of "YES" in Step 550), the brake CPU transfers the routine to Step 1110 via Step 560. Then, in Step 1110, the brake CPU determines whether the accelerator pedal operating level AP has a positive value (that is, the accelerator is turned on) and the brake pedal operating level BP is "0" (that is, the brake is turned off).

When the accelerator is turned on and the brake is turned off, the brake CPU determines "YES" in Step 1110, sets the value of the normal suppression flag Xyn to "1" in Step 1120, transfers this routine to Step 1195, and temporarily ends the routine.

On the other hand, when the accelerator is not turned on and the brake is not turned off, the brake CPU determines "NO" in Step 1110, and determines whether a value of an erroneous stepping flag Xgf is "1" in Step 1130. When the value is "1," the erroneous stepping flag Xgf indicates that there is a possibility of erroneously operating (erroneously stepping on) the accelerator pedal 11" (hereinafter also referred to as a "possibility of erroneous accelerator pedal stepping"). When the value is "0," the erroneous stepping flag Xgf indicates that there is no possibility of erroneous accelerator pedal stepping." The value of the erroneous stepping flag Xgf is set to "0" in the above-mentioned initial routine and a routine illustrated in FIG. 13 to be described later, and is set to "1" in the routine illustrated in FIG. 13.

When the value of the erroneous stepping flag Xgf is "1," the brake CPU transfers the routine from Step 1130 to Step 1140, sets the value of the output suppression flag Xyk to "1" in Step 1140, transfers this routine to Step 1195, and temporarily ends the routine. On the other hand, when the value of the erroneous stepping flag Xgf is "0," the brake CPU directly transfers the routine from Step 1130 to Step 1195 and temporarily ends the routine.

Figure 12:
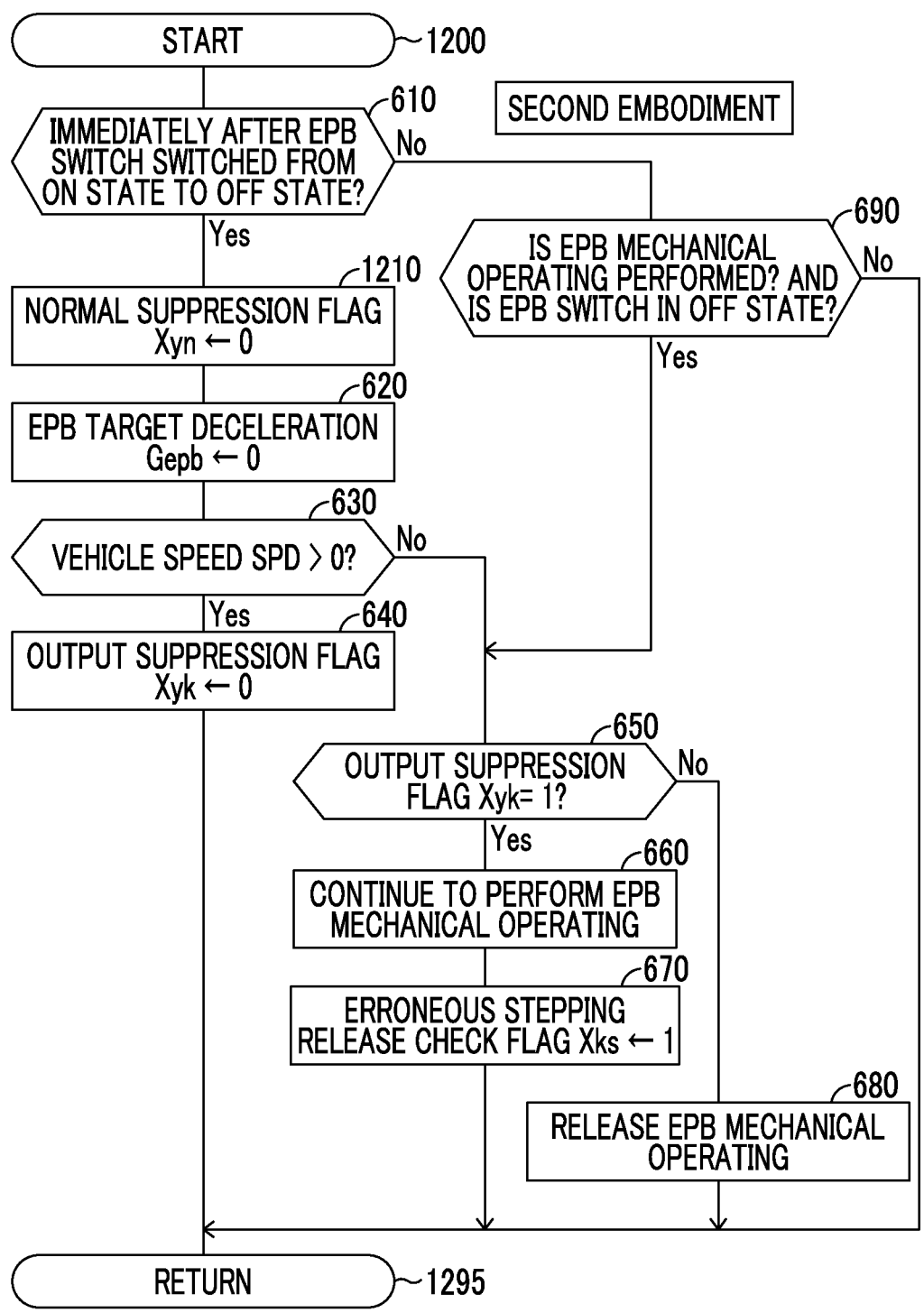
FIG. 12 is a flowchart illustrating a routine which is performed by the brake CPU according to the second embodiment.

The brake CPU of the second controller performs a routine illustrated in FIG. 12 whenever a predetermined time elapses. This routine is the same as the routine illustrated in FIG. 6, except that Step 1210 is added between Step 610 and Step 620 in the routine illustrated in FIG. 6.

More specifically, when the current time point is "immediately after the EPB operating switch 61 is switched from the ON state to the OFF state" (see the determination of "YES" in Step 610), the brake CPU sets the value of the normal suppression flag Xyn to "0" in Step 1210.

In this way, the value of the normal suppression flag Xyn is set to "1" when the vehicle is traveling immediately after the EPB operating switch 61 is switched from the OFF state to the ON state, the accelerator pedal is turned on, and the brake pedal is turned off (see Step 1120), and is set to "0" immediately after the EPB operating switch 61 is switched from the ON state to the OFF state (see Step 1210).

Figure 13:
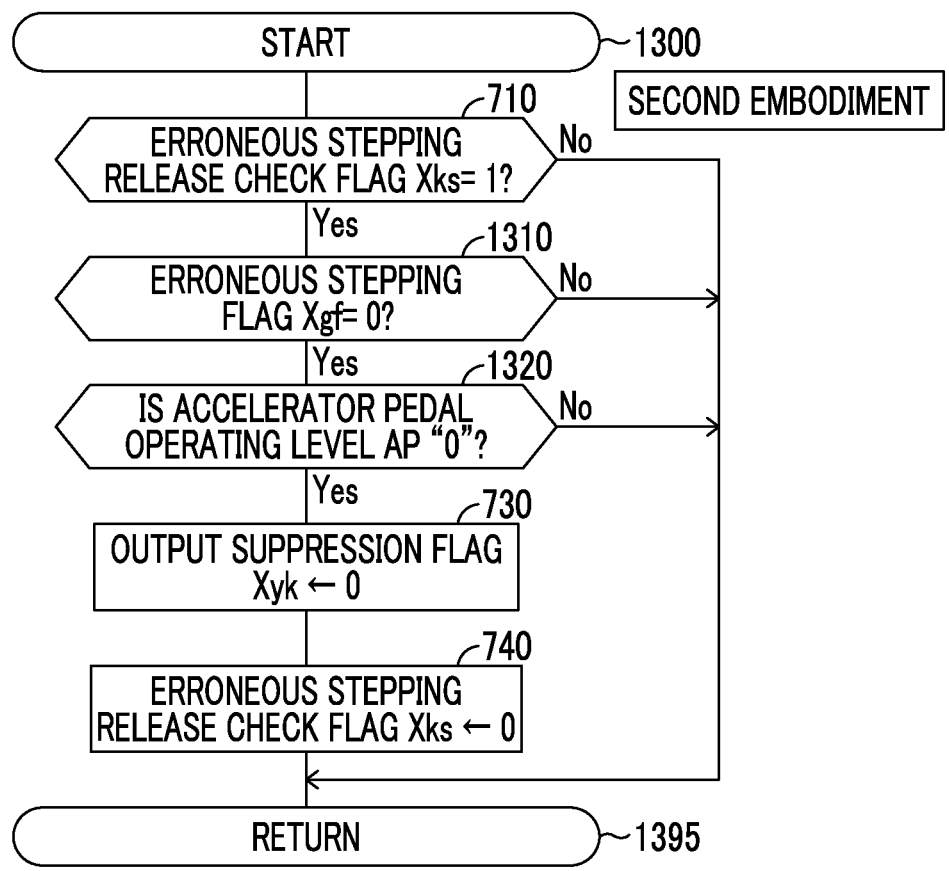
FIG. 13 is a flowchart illustrating a routine which is performed by the brake CPU according to the second embodiment.

The brake CPU of the second controller performs a routine illustrated in FIG. 13 whenever a predetermined time elapses. This routine is the same as the routine illustrated in FIG. 7, except that Step 720 in the routine illustrated in FIG. 7 is replaced with Step 1310 and Step 1320.

More specifically, when the value of the erroneous stepping release check flag Xks is "1," the brake CPU determines "YES" in Step 710, and determines whether the value of the erroneous stepping flag Xgf is "0" in Step 1310. When the value of the erroneous stepping flag Xgf is "1," the brake CPU determines "NO" in Step 1310, transfers this routine directly to Step 1395, and temporarily ends the routine.

On the other hand, when the value of the erroneous stepping flag Xgf is "0," the brake CPU determines "YES" in Step 1310, and determines whether the possibility of erroneously stepping on the accelerator pedal 11 is extinguished by determining whether the accelerator pedal operating level AP is returned from a positive value to "0" (that is, whether the accelerator pedal operating level AP is changed to "0") in Step 1320.

When the accelerator pedal operating level AP is maintained in a positive value, the brake CPU determines "NO" in Step 1320, transfers this routine directly to Step 1395, and temporarily ends the routine.

On the other hand, when the accelerator pedal operating level AP is returned from a positive value to "0," the brake CPU determines "YES" in Step 1320, sequentially performs the processes of Steps 730 and 740, and transfers this routine to Step 1395. As a result, both values of the output suppression flag Xyk and the erroneous stepping release check flag Xks are set (returned) to "0."

Figure 14:
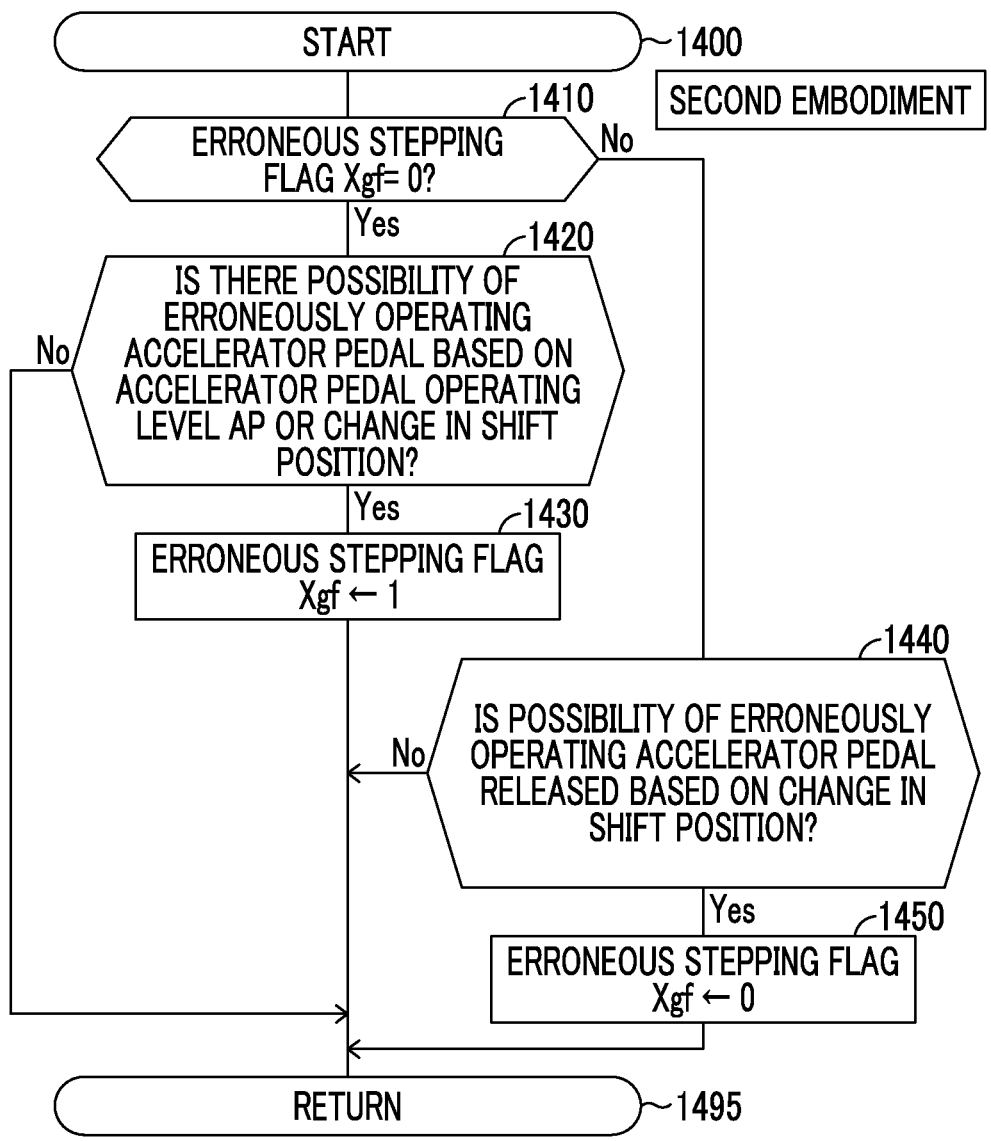
FIG. 14 is a flowchart illustrating a routine which is performed by the brake CPU according to the second embodiment.

The brake CPU of the second controller performs a routine illustrated in FIG. 14 whenever a predetermined time elapses. Accordingly, at an appropriate timing, the brake CPU starts the routine from Step 1400 in FIG. 14, and determines whether the value of the erroneous stepping flag Xgf is "0" in Step 1410.

When the value of the erroneous stepping flag Xgf is "0," the brake CPU transfers the routine from Step 1410 to Step 1420, and determines whether the "possibility of erroneous accelerator pedal stepping" occurs based on at least one of the variation of the accelerator pedal operating level AP and the variation of the shift position. More specifically, the brake CPU determines that the possibility of erroneous accelerator pedal stepping occurs when any of Condition 1 and Condition 2 to be described below is satisfied.
(Condition 1)

The accelerator pedal operating level AP has a positive value (that is, the accelerator is turned on) and the brake pedal operating level BP has a positive value (that is, the brake is turned on).
(Condition 2)

One of the followings occurs in a state in which the accelerator pedal operating level AP is greater than "0" within a predetermined time (several seconds) prior to the time point at which the EPB operating switch 61 is switched from the OFF state to the ON state. A. The shift position changes from a non-driving position to a driving position. B. The shift position changes from a forward driving position to the reversing position. C. The shift position changes from the reversing position to a forward driving position.

When neither of Condition 1 and Condition 2 is satisfied, the brake CPU determines "NO" in Step 1420, transfers this routine directly to Step 1495, and temporarily ends the routine. On the other hand, when at least one of Condition 1 and Condition 2 is satisfied, the brake CPU determines "YES" in Step 1420, and sets the value of the erroneous stepping flag Xgf to "1" in Step 1430. Thereafter, the brake CPU transfers this routine to Step 1495 and temporarily ends the routine.

On the other hand, when the value of the erroneous stepping flag Xgf is "1" at the time point at which the brake CPU performs the process of Step 1410, the brake CPU determines "NO" in Step 1410, and determines whether the "possibility of erroneous accelerator pedal stepping" is extinguished based on the change of the shift position in Step 1440.

More specifically, when the following condition is satisfied, the brake CPU determines that the possibility of erroneous accelerator pedal stepping is extinguished.
(Condition 3)

The shift position changes to a non-driving position (the P range or the N range).

When Condition 3 is not satisfied, the brake CPU determines "NO" in Step 1440, transfers this routine directly to Step 1495, and temporarily ends the routine. On the other hand, when Condition 3 is satisfied, the brake CPU determines "YES" in Step 1440, and sets the value of the erroneous stepping flag Xgf to "0" in Step 1450. Thereafter, the brake CPU transfers this routine directly to Step 1495, and temporarily ends the routine.

The brake CPU of the second controller performs the routine illustrated in FIG. 8 whenever a predetermined time elapses.

As described above, according to the second controller, when a driver tries to stop the vehicle Ve by turning on the EPB operating switch 61 and there is a possibility of erroneous accelerator pedal stepping, the EPB mechanical operating state is maintained even after the vehicle Ve stops and the process of setting the vehicle driving torque to a small torque (the second torque) (the process of setting the value of the output suppression flag Xyk to "1") is performed. Accordingly, the second controller can prevent the vehicle Ve from starting suddenly, when the driver stops the vehicle Ve by turning on the EPB operating switch 61 while erroneously stepping on the accelerator pedal 11 and then the driver switches the EPB operating switch 61 to the OFF state in a state in which the accelerator ON state is maintained.

The disclosure is not limited to the above-mentioned embodiments and can employ various modified examples within the scope of the disclosure. For example, the drive source of the vehicle Ve may include only an electric motor as in an electric vehicle, or may include both an electric motor and an internal combustion engine as in a hybrid vehicle. The internal combustion engine 10 may be a diesel engine instead of the spark-ignition engine. In this case, a torque of the diesel engine (the vehicle driving torque) can be controlled by changing an amount of fuel injected.

By setting the value of the EPB target deceleration Gepb to the value A in Step 560 and performing the routine illustrated in FIG. 8, the brake CPU in the above-mentioned embodiments generates a braking force to be applied to the vehicle wheel W using the hydraulic braking force generating mechanism when the EPB operating switch 61 is switched to the ON state while the vehicle is traveling. However, in this case, the brake CPU may be configured to add a predetermined brake oil pressure to the wheel cylinder 21L and the brake caliper 22L using the brake oil pressure actuator 31.

What is claimed is:

1. A vehicle controller which is applied to a vehicle including a drive source that generates a vehicle driving torque for causing the vehicle to travel and a braking device that applies a braking force to vehicle wheels of the vehicle, the vehicle controller comprising:
   a braking force control unit configured to change the braking force which is applied to the vehicle wheels by the braking device; and
   a driving torque control unit configured to set the vehicle driving torque generated by the drive source to a first torque which varies depending on an operation level of an accelerator operator,
   wherein, when the vehicle is traveling and a switch for causing an electric parking brake to operate is operated in an accelerator ON state in which the accelerator operator operates, the braking force control unit is configured to apply the braking force to the vehicle wheels using the braking device and the driving torque control unit is configured to set the vehicle driving torque to a second torque which is smaller than the first torque, and then when the switch for releasing the electric parking brake is operated in a specific state in which the accelerator ON state is maintained and the vehicle has stopped, the braking force control unit is configured to continue to apply the braking force to the vehicle using the braking device and the driving torque control unit is configured to set the vehicle driving torque to the second torque.

2. The vehicle controller according to claim 1, wherein, when the accelerator ON state is switched to an accelerator OFF state in which the accelerator operator does not operate after the switch for releasing the electric parking brake is operated in the specific state, the braking force control unit is configured to extinguish the braking force applied to the vehicle wheels and the driving torque control unit is configured to set the vehicle driving torque to the first torque.

3. The vehicle controller according to claim 1, wherein the braking device includes:
   a hydraulic braking force generating mechanism configured to apply a braking force to the vehicle wheels depending on a hydraulic pressure of a brake oil supplied from a hydraulic circuit; and
   a mechanical parking brake mechanism configured to apply a braking force to the vehicle wheels depending on a rotational position of an electric motor, and
   the braking force control unit is configured to apply the braking force to the vehicle wheels using the hydraulic braking force generating mechanism when the switch for causing the electric parking brake to operate is operated in a state in which the vehicle is traveling and the accelerator ON state is set, and then to extinguish the braking force using the hydraulic braking force generating mechanism and to apply the braking force to the vehicle wheels using the mechanical parking brake mechanism when the vehicle stops in a state in which the accelerator ON state is maintained.

4. A vehicle controller which is applied to a vehicle including a drive source that generates a vehicle driving torque for causing the vehicle to travel and a braking device that applies a braking force to vehicle wheels of the vehicle, the vehicle controller comprising:
   a first electronic control unit configured to change the braking force which is applied to the vehicle wheels by the braking device; and
   a second electronic control unit configured to set the vehicle driving torque generated by the drive source to a first torque which varies depending on an operation level of an accelerator operator,
   wherein, when the vehicle is traveling and a switch for causing an electric parking brake to operate is operated in an accelerator ON state in which the accelerator operator operates, the first electronic control unit is configured to apply the braking force to the vehicle wheels using the braking device and the second electronic control unit is configured to set the vehicle driving torque to a second torque which is smaller than the first torque, and then when the switch for releasing the electric parking brake is operated in a specific state in which the accelerator ON state is maintained and the vehicle has stopped, the first electronic control unit is configured to continue to apply the braking force to the vehicle using the braking device and the second electronic control unit is configured to set the vehicle driving torque to the second torque.

* * * * *

UNITED STATES PATENT AND TRADEMARK OFFICE
CERTIFICATE OF CORRECTION

PATENT NO. : 10,377,382 B2  
APPLICATION NO. : 15/609949  
DATED : August 13, 2019  
INVENTOR(S) : Yoshiyuki Senba et al.

Page 1 of 1

It is certified that error appears in the above-identified patent and that said Letters Patent is hereby corrected as shown below:

In the Drawings

In sheet 11, figure 11, block (550), delete "OPEATING" and insert --OPERATING--, therefor.

In the Specification

In Column 5, Line 34, delete "BR" and insert --BP.--, therefor.

In Column 14, Line 1, after "constant value", delete "a" and insert --$\alpha$--, therefor.

Signed and Sealed this  
First Day of October, 2019

Andrei Iancu  
*Director of the United States Patent and Trademark Office*